United States Patent [19]

Marlor

[11] Patent Number: 5,391,523

[45] Date of Patent: Feb. 21, 1995

[54] ELECTRIC LAMP WITH LEAD FREE GLASS

[76] Inventor: Richard C. Marlor, 77 Lothrop St., Beverly, Mass. 01915

[21] Appl. No.: 144,114

[22] Filed: Oct. 27, 1993

[51] Int. Cl.6 .......................... C03C 3/085; C03C 8/00
[52] U.S. Cl. ........................................ 501/14; 501/66; 501/69; 501/70; 313/623; 313/636
[58] Field of Search ...................... 501/14, 62, 69, 70, 501/66; 313/623, 636

[56] References Cited

U.S. PATENT DOCUMENTS

| | | | |
|---|---|---|---|
| 1,830,904 | 11/1930 | Hood . | |
| 1,968,823 | 8/1934 | Gaides | 176/122 |
| 2,812,465 | 11/1957 | Germeshausen | 313/207 |
| 2,847,605 | 8/1958 | Byer | 313/346 |
| 2,877,124 | 3/1959 | Welsch | 501/70 X |
| 3,252,812 | 5/1966 | deLajarte | 501/67 X |
| 3,258,351 | 6/1966 | Paymal | 501/66 |
| 3,258,352 | 6/1966 | Paymal | 501/66 |
| 3,505,553 | 4/1970 | Piree | 313/107 |
| 3,634,111 | 1/1972 | Foster | 106/40 |
| 3,672,919 | 6/1972 | Sack | 106/52 |
| 3,798,492 | 3/1974 | Menelly | 313/346 |
| 3,858,964 | 1/1975 | Piesslinger | 501/69 |
| 3,875,629 | 4/1975 | Kerstetter | 29/25.14 |
| 3,879,830 | 4/1975 | Buescher | 29/182.3 |
| 3,960,271 | 9/1975 | Aptt, Jr. | 313/213 |
| 3,969,279 | 7/1976 | Kern | 252/521 |
| 4,089,694 | 5/1978 | Thomas et al. | 501/70 X |
| 4,091,951 | 5/1978 | Zijlstra et al. | 501/70 X |
| 4,105,826 | 8/1978 | Thomas | 501/14 X |
| 4,238,705 | 12/1980 | Thomas | 501/69 X |
| 4,461,970 | 7/1984 | Anderson | 313/240 |
| 4,533,852 | 8/1985 | Frank | 313/346 |
| 4,599,319 | 7/1986 | Sack | 501/57 |
| 4,605,632 | 8/1986 | Elmer | 501/54 |
| 4,607,016 | 8/1986 | Danielson | 501/70 |
| 4,608,351 | 8/1986 | Bondot | 501/62 |
| 5,180,695 | 1/1993 | Weiss et al. | 501/69 X |
| 5,214,351 | 5/1993 | Nieda | 313/619 |
| 5,278,474 | 1/1994 | Nieda | 312/631 |
| 5,304,893 | 9/1994 | Nieda | 313/631 |

FOREIGN PATENT DOCUMENTS

| | | | |
|---|---|---|---|
| 2047661 | 4/1971 | Germany | 501/66 |
| 2132705 | 1/1973 | Germany | 501/69 |
| 4413031 | 6/1969 | Japan | 501/69 |
| 4917410 | 2/1974 | Japan | 501/69 |
| 57-51150 | 3/1982 | Japan | 501/66 |
| 58-60638 | 4/1983 | Japan | 501/66 |
| 219763 | 6/1968 | U.S.S.R. | 501/69 |

OTHER PUBLICATIONS

M. Volf, "Technical Glasses", Sir Isaac Pitman & Sons Ltd. London, No month (1961).

*Primary Examiner*—Karl Group

[57] ABSTRACT

An electric lamp having a light source, glass envelope made of a lead free glass, electric leads, and contacts, is disclosed. The compositional range of the envelope glass may be used in existing lamp manufacturing equipment, and otherwise substantially meets the manufacturing and product requirements normally met only by lead glass. The resulting lamp product has the same cost, and product performance, but now has the environmentally desirable feature of being lead free.

15 Claims, 3 Drawing Sheets

ELECTRIC LAMP WITH LEAD FREE GLASS

1. Technical Field

The invention relates to electric lamps and particularly to lamps made with glass envelopes or glass mounts. More particularly the invention is concerned with an electric lamp made with a lead free glass composition.

2. Background Art

Lead for centuries has played an important role in making glass the common, easily formed, low cost material that it is. Lead in glass lowers the softening and melting points of glass making the glass workable at lower temperatures. There is now a environmental effort to eliminate lead from products commonly discarded in landfills, including glass products such as electric lamps. Conceptually, the elimination of lead from glass is simple. One needs merely to remove lead from the existing formulations and melt and work the lead free formulation at a higher temperature. This is not a practical solution. For example, lead glasses are commonly used to make electric lamps, where the lamp cost depends largely on the raw material cost, the speed at which glass can be formed (equipment utilization speed) and the energy cost of processing the glass. Simply removing lead from glass formulas would then require re-equiping factories to operate with higher temperature glass, and paying the continuing higher fuel costs.

Most known lead free glasses would be impractical in existing lamp making equipment, since the melting and softening points are too high, thereby requiring excessive amounts of fuel. Alternatively, the material may have too high or too low a viscosity, thereby flowing too quickly or to slowly. The forming machinery would then need to be adjusted to accommodate the more or less fluid material. Also, the pressing, bending, and blowing of the glass as the case may be, would need re-adjustment to accommodate the new material. As a result, simple elimination of lead would then drive up the manufacturing cost of electric lamps substantially. For these reasons there is a need for a lead free glass that has nearly the same mechanical working characteristics as the leaded glass used before.

There are numerous low lead and lead free glass formulations, however they are generally not suitable for most incandescent and fluorescent lighting products. Most glass tubing used to make lamps is made by the Vello tube drawing process. The Vello process produces tubes with excellent dimensional quality at very high drawing speeds, but forms the glass tubing at relatively high viscosities, thereby requiring glass compositions having low liquidus temperatures. Lead glasses typically melt at lower temperatures, and melt more efficiently than lead free glasses due to the fluxing ability of lead oxide. Lead glasses usually work well in the Vello process. The Vello process has been found to work best when the glass being formed has a viscosity of about 50,000 poise. It is also desirable to have a 50° C. or more temperature difference between the liquidus temperature and the working temperature. While a number of borosilicate and lime glasses are normally drawn by the Vello process for lamp making, there is no known lead free glass that works well in the Vello process and still provides the necessary electrical resistivity needed in lamp glasses. There is then a need for a lead free lamp glass that can be made into tubes by the Vello process.

A lead free glass which melts at lower temperatures would save energy. To manufacture the large variety of incandescent and fluorescent lamp products, tubing must be reworked on a variety of lamp working machines. This equipment must be versatile since there are thousands of lamp shapes which must be manufactured by the same process.

Reworking the glass tubing to form flares, mounts, and blown bulbs used to seal and manufacture lamps requires a glass with a long working range, that is, one where there is a large temperature difference between the softening temperature and the working temperature of the glass. Most lead free and low lead glass compositions have short working ranges. A short working range requires very close temperature control at every production (index) station in the lamp manufacturing process. Glasses with short working ranges, such as those typical of low lead and lead free glasses, tend to result in products with poor dimensional control, and many glass defects. The labor and equipment required to monitor the lamp manufacturing process properly would raise manufacturing costs. For these reasons, there is a need for a lead free glass that has nearly the same mechanical working characteristics as the leaded glass already in use.

Lead glass also has a high resistivity to electric fields. High electrical resistivity is required in the lamp glass to wire seals, to prevent alkali migration during lamp operation. The alkali migration is commonly referred to as electrolysis, and can result in the glass cracking. High wattage incandescent lamps are most prone to electrolysis since they typically operate at high temperatures, and high voltages. Removal of the lead reduces the electrical resistance of the glass. There is then a need for an electric lamp with lead free glass, having a high electrical resistivity.

The glass must seal with the leads that penetrate the envelope to provide electric power to the light source. Large differences in thermal expansion can cause the glass to crack, thereby breaking the hermetic lamp seal. Air then penetrates the envelope and oxidizes the filament. There is then a need for an electric lamp with a lead free glass seal, wherein the glass has a thermal expansion matched to that of the lamp leads. There is then a need for an electric lamp having a practical and functional lead free glass formulation.

Examples of the prior art are shown in U.S. patents.

U.S. Pat. No. 2,877,124 to Welsh, teaches lead free glasses that do not have the high electrical resistivities required for lamps.

US Pat. No. 4,089,694 to Thomas et. al. describes lamp glasses containing small amounts of baria and lithia as a replacement for lead in glass. The $K_2O$ to $Na_2O$ molar ratios are quite low, so the electrical resistivities are insufficient for most incandescent lighting applications. Fluorine was also required to improve glass melting and workability. Fluorine is undesirable since it is volatile and hazardous during glass melting.

U.S. Pat. No. 3,252,812, to DeLajarte, teaches lead free glasses that do no include lithia. The liquidus temperature of the DeLajarte glasses range from 1070° C. to 1146° C. which are too high, and the glass too soft for the Vello tube drawing process. The DeLajarte compositions would therefore devitrify prior to being Vello formed into tubing.

Kokai patent No. Sho 58[11983]-60638 to Kawaguchi et. al. concerns lead free glasses suitable for manufacture of fluorescent lamp bulbs. They claim that their glass with BaO above 3.0 weight percent results in devitrification of the composition. The high electrical resistivities required for many incandescent lamps forces the BaO concentrations above this level.

Kokai patent No. Sho 57[11982]-51150, to Sakamoto and Hayami also teaches lead free glasses for fluorescent lamp bulbs. With their compositions, BaO below 10.1 weight percent resulted in a more constricted, poorer working glass.

DISCLOSURE OF THE INVENTION

An electric lamp made with a lead free glass having a light source enclosed in a glass body including at least a portion formed from a sealing glass having a weight percent composition of $SiO_2$ (64.3 to 70.7), BaO (6.2 to 10.5), CaO (2.5 to 5.7), $Na_2O$ (7.0 to 12.0), $K_2O$ (5.5 to 10.2), $Li_2O$ (0.0 to 2.0), $Al_2O_3$ (3.0 to 5.3), $B_2O_3$ (0.0 to 3.0), $Sb_2O_3$ (0.2 to 0.4) having an electrical resistivity, $log_{10}$ volume electrical resistivity, of 6.0 ohm centimeters at 350° C. or greater. Electric leads having interior ends coupled to the light source, having middle sections pass from the interior of the envelope to the exterior of the envelope, and couple to contacts along the exterior ends of the lamp leads to receive electric power.

BEST MODE FOR CARRYING OUT THE INVENTION

Figure 1:
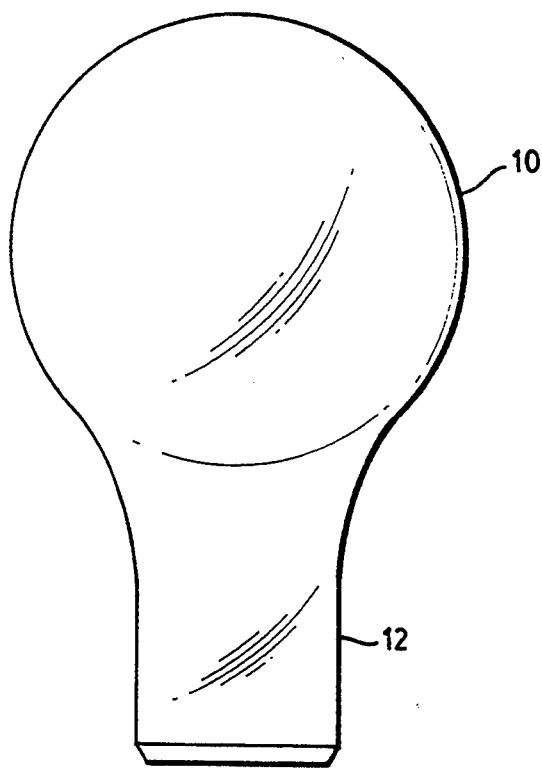
FIG. 1 shows a blown bulb made with lead free glass as may be used in making an incandescent lamp.
Figure 3:
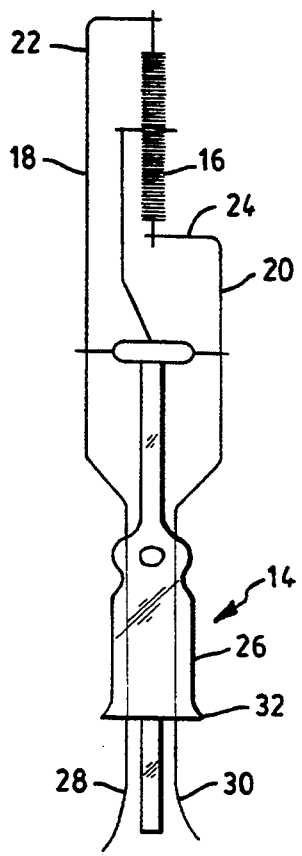
FIG. 3 shows a filament mount made with lead free glass as may be used in making an incandescent lamp.
Figure 2:
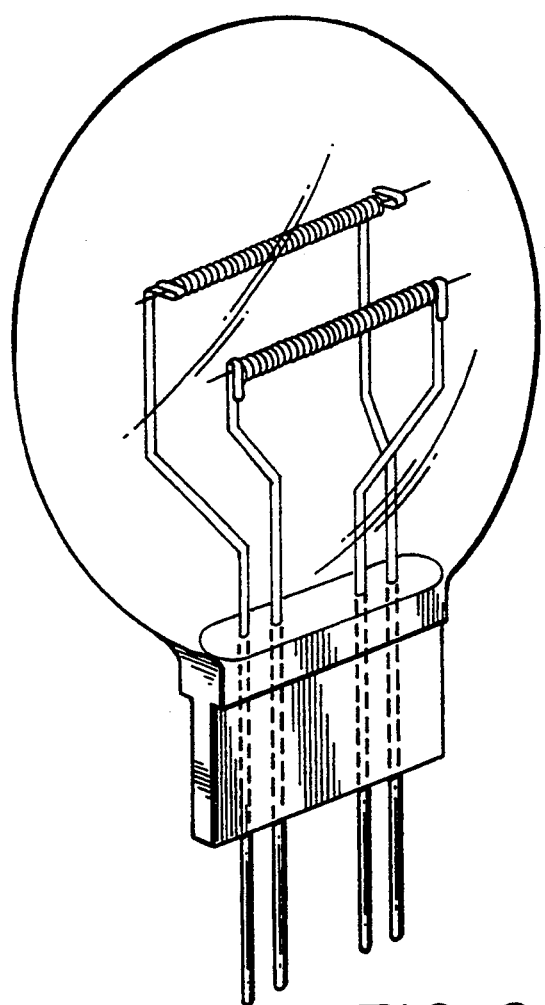
FIG. 2 shows an incandescent lamp capsule made with lead free glass bulb.

FIG. 1 shows a blown bulb made with lead free glass as may be used in making an incandescent lamp. The bulb 10 consists of a glass body substantially enclosing an interior volume. A necked region 12 defining an open passage connects the interior of the bulb to the exterior. Where the bulb 10 is sealed directly to the lead wires, as in press sealed miniature lamps, it is reasonable to use the lead free glass to take advantage of the electrical resistivity, and the thermal expansion characteristics of the lead free glass formulation. FIG. 2 shows an incandescent lamp capsule made from a lead free glass bulb. The lead free glass bulb encloses two filaments that are each supported by two leads. The four support leads each extend through a press seal to the exterior of the lamp capsule. The bulb and leads have thermally matched expansions to assure good sealing between the bulb and leads. Miniature lamps are commonly made in this fashion.

Where the bulb 10 is sealed to mount structure, such as in FIG. 3, the bulb would normally be made of a lime glass, and only the mount, as in FIG. 3, would be made of the lead free glass. FIG. 3 shows a filament mount 14 made with lead free glass as may be used in making an incandescent lamp. The filament mount 14 comprises a filament 16 electrically coupled to two leads 18, 20 at interior ends 22, 24 of the leads 18, 20. The filament 14 may be additionally held by any of numerous filament support structures as known in the art. The leads 18, 20 have middle regions extending through, and sealing with a glass body 26, and exterior ends 28, 30 extending beyond the glass body 26 for connection to an Edison or other type lamp base. The electric leads 18, 24 may be made out of electrically conductive wire, commonly nickel coated copper or other lead wire materials, such as dumet, nickel, niron (Fe-Ni alloy), and Sylvania #4 alloy, as commonly used in the lighting industry. The lead wires may have the general form of straight leads extending from connection points with the light source in the interior of the envelope through the envelope to the exterior of the envelope to exterior contacts. Given the similarity of thermal expansions between existing lamp glasses, and the new formulation, differing lamp components of old and new formulations may be easily combined in one structure. Integration of the new glass formulation into manufacturing processes may proceed with little manufacturing disruption.

Figure 4:
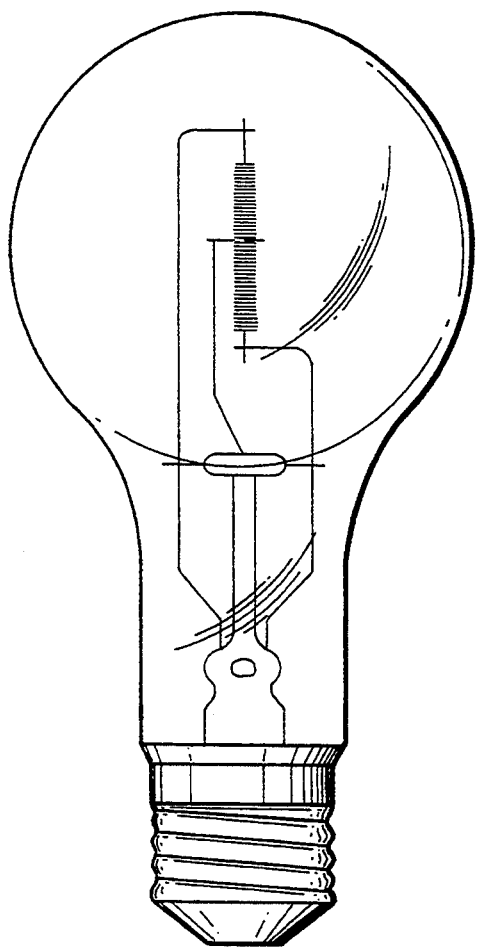
FIG. 4 shows an incandescent lamp made with lead free glass mount.

The glass body 26 may include a disk or flared rim 32 that may be fitted and then seal to the necked region 12 of the open passage of a blown bulb 10 with the filament 16 enclosed in the interior of the blown bulb 10, and the exterior ends 28, 30 of the leads extending outwards. FIG. 4 shows an incandescent lamp made with lead free glass formed from a blown bulb 10 and an incandescent filament mount 14. The blown lime glass bulb 10 and mount 14 have been sealed together, and a threaded base has been attached, and electrically coupled to the leads 18, 20.

Figure 5:
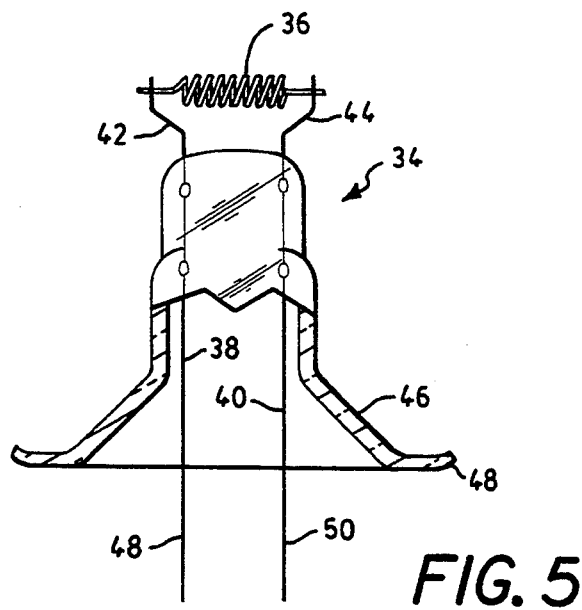
FIG. 5 shows a filament mount made with lead free glass as may be used in making a fluorescent lamp.
Figure 6:
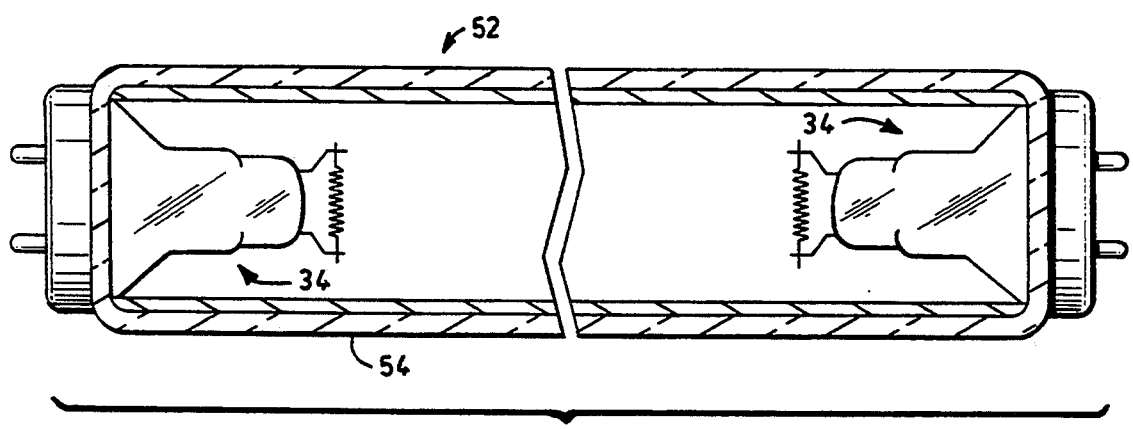
FIG. 6 shows a fluorescent lamp made with lead free glass, partially broken away.

FIG. 5 shows a filament mount 34 made with lead free glass as may be used in making a fluorescent lamp. The filament mount 34 comprises a filament 36 electrically coupled to two leads 38, 40 at interior ends 42, 44. The leads 38, 40 have middle regions extending through, and sealing with a glass body 46. The exterior ends 48, 50 of the leads 38, 40 extend for connection to an single pin, double pin, threaded or other fluorescent lamp base. The glass body 46 may include a disk or flared rim 48 that may be fitted and then sealed to the open passage of a fluorescent lamp tube. The exterior ends 48, 50 of the leads extending outwards, where they may be coupled to either the single pin, double pin, threaded or other fluorescent lamp tube connection. FIG. 6 shows a fluorescent lamp 52 made with lead free glass formed from a phosphor coated cylindrical tube 54 and a fluorescent lamp mount 34. The mount 34 and tube 54 have been sealed together, and a two pin base has been attached, and electrically coupled to the leads 38, 40. The exterior contacts may be made out of conductive metal, such as brass, to have the familiar electrical contacts common to lamps, such as a threaded Edison base or a two pin fluorescent lamp. The light source electrically is then coupled thought the leads to the contacts, with the glass mount or envelope sealing to the leads.

Figure 7:
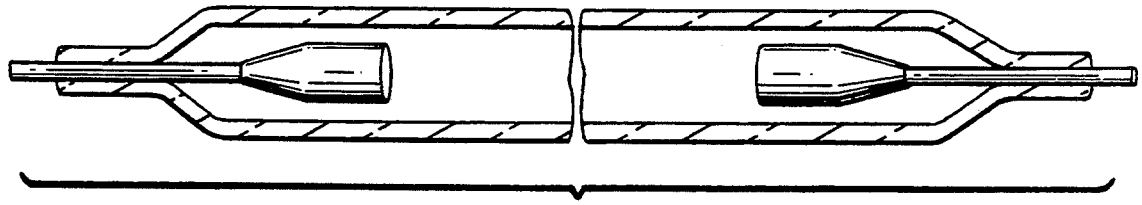
FIG. 7 shows a neon lamp made with a lead free glass tube, partially broken away.

FIG. 7 shows a neon lamp made with a lead free glass tube, partially broken away. Neon lamps may be formed from glass tubes, sealed at each end to an electrode. The electrodes are commonly molybdenum wires extending through a press seal to join with a cup, coil so similar support for an emitter material. It has recently been found that neon lamps manufactured with the lead free glass SG64 do not darken around the electrodes, during lamp life. This is believed to result from the fact that the tight glass structure of lead free glass SG64 significantly suppresses mercury penetration into the glass. A neon lamp with a gas fill including five or more molar percent neon may be made with a lead free glass according to well known designs.

The blown bulb, incandescent mount, fluorescent mount, fluorescent tube, or most any other glass lamp component may be made out of lead free glass. The lead free composition is particularly useful where the leads are sealed in the glass. When the leads are sealed in the glass, the electrical resistivity of the glass is an important feature. Since the lead free glass is more expensive to make than, for example, regular lime glass, it is economical to make the only the glass component that includes the lead portion out of the lead free glass. The lead free glass component may then be combined with lime glass components as needed. For example, a lead free glass may be formed into a mount, and sealed to a regular lime glass bulb, so the light source is enclosed in a glass envelope. It is of course possible to make the whole lamp from the lead free glass. The preferred lead free glass is made of a composition, having a weight percent with the following ranges:

| | |
|---|---|
| $SiO_2$ | 64.3 to 70.7 |
| $BaO$ | 6.2 to 10.5 |
| $CaO + MgO$ | 2.5 to 5.7 |
| $Na_2O$ | 7.0 to 12.0 |
| $K_2O$ | 5.5 to 10.2 |
| $Li_2O$ | 0.0 to 2.0 |
| $Al_2O_3$ | 3.0 to 5.3 |
| $B_2O_3$ | 0.0 to 3.0 |
| $Sb_2O_3$ | 0.0 to 0.75 (fining agent) |

MgO is known as a partial substitute for CaO, but this substitution detrimentally affects the electrical resistivity. This affect can to a degree be offset by adjusting the BaO component. Dolomite ($CaMg(CO_3)_2$) is an inexpensive combined source of Ca and Mg that may be used and offset for by adjusting the BaO.

Antimony, present in the composition as $Sb_2O_3$, is used as a fining agent to help release trapped gas from the glass melt. The actual weight percent of $Sb_2O_3$ used was 0.34, but 0.0 to 0.75 or more weight percent could be used. Antimony is expensive and is usually used sparingly for cost considerations. Other fining agents, such as sodium sulfate, ceria or a variety of others may be used up to perhaps 1.0 weight percent.

Within the above compositional range the following weight percentage composition, known as SG64, is preferred:

| | |
|---|---|
| $SiO_2$ | 66.09 |
| $BaO$ | 8.09 |
| $CaO$ | 2.66 |
| $Na_2O$ | 7.41 |
| $K_2O$ | 7.00 |
| $Li_2O$ | 1.28 |
| $Al_2O_3$ | 4.70 |
| $B_2O_3$ | 2.39 |
| $Sb_2O_3$ | 0.34. |

The lead free glass SG64 formulation gave a softening point of 667° C. (+/−5° C.), a working point of 978° C. (+/−5° C.), and a viscosity of 50,000 poise, at 887° C. (+/−5° C.). The $\log_{10}$ volume electrical resistivity was found to be about 7.0 ohm centimeters at 350° C. The thermal expansion was $91.5 \times 10^{-7}$ in/in/° C. ($+/- 1.5 \times 10^{-7}$ in/in/° C.) from 0° C. to 300° C. Testing incandescent lamps made with lead free glass SG64, showed the glass to be a reliable substitute in all lamp manufacturing applications for the standard lead glass known as SG10. The lead free glass SG64 was found to have an electrical resistivity ($\log_{10}$ rho) at 400° C. of 6.3, which is twice that of the lead glass SG10 value of 6.0. The reason for high electrical resistivity is thought to be the use of the triple mixed alkali ($Na_2O/K_2O/Li_2O$) whereby the $K_2O$ to $Na_2O$ molar ratio is between 0.5 to 1.0. $Li_2O$ was substituted for some of the $Na_2O$, and CaO was added for a portion of the alkaline earths. The upper range of the $K_2O$ to $Na_2O$ molar ratio was chosen for material cost considerations. Inclusion of a third alkali, lithia, for a portion of the sodium, further tightens the glass structure. The CaO has the highest effect on maximizing electrical resistance of all the alkaline earths. BaO was also added to improve electrical resistivity.

The thermal expansion of sealing glasses must be controlled to prevent glass fracture at any time throughout the life of the lamp. Thermal expansion was measured with a dilatometer from room temperature to 300° C. Seal stress and strain, between lead free glass SG64 and various soda lime glasses, was measured using the trident seal test. The trident seal test measures the thermal contraction mismatch between two glasses sealed together. The thermal contractions are measured from the glass setting point to room temperature. Compositionally, it was determined that $B_2O_3$ is the key constituent for controlling thermal expansion for high expansion lithia containing glasses. $B_2O_3$ lowers thermal expansion without drastically affecting glass viscosity. The addition of $B_2O_3$ to high lithia containing lead free glasses improved the seal compatibility with existing soda lime glasses and feed through wires. The thermal expansion was $91.5 \times 10^{-7}$ in/in/° C. ($+/- 1.5 \times 10^{-7}$ in/in/° C.) from 0° C. to 300° C.

A lead free glass composition can now be made that seals to existing sealing glasses, and wires, while maintaining viscosity characteristics similar to those of the lead glass used for high speed lamp sealing. The lead free glass SG64 is expected to work as well during glass sealing, and produce the same quality seal, at efficiencies similar to lead glass S10. Production speeds may vary from handworking (neon sign industry) to high production speed items such as fluorescent lamp flares made at about 10,000 units per hour. The lead free glass SG64 has a melting viscosity 80° C. lower than that of lead glass S10. The temperature of SG64 at 1000 poise is 53° C. lower than that of S10. Viscosities with the range of 100 to 1000 poise is important for melting and fining the glass. Within this viscosity range, lead free SG64 is softer than lead glass SG10, which is a manufacturing advantage for furnace fuel economy. The glass working range for lead free glass SG64 of 311° C. is somewhat less than the working range of lead glass SG10 of 368° C. The lower working range allows for faster Vello drawing speeds, and fewer indexes between glass forming and glass annealing on the high speed production lamp sealing equipment.

Lithia ($Li_2O$) and baria (BaO) are key ingredients to the lead free glass formulation as these are suitable substitutes for lead oxide (PbO) for controlling the glass viscosity curve. For a given change in thermal expansion, lithia ($Li_2O$) had the most effect on lowering glass viscosity of any component. Reducing the viscosity with lithia (Li$_2$O) allowed for large additions of both BaO and CaO that improve electrical resistivity, without adversely affecting the viscosity curve. The lead free formulation therefore allowed for working and sealing a lead free glass on existing processing equipment designed for the easily worked lead glasses.

Chemical durability of the lead free glass SG64 was also measured by using the USP III Powder Durability Test procedures. The USP III ranking for the lead glass SG10 is 12.4 ml H$_2$SO$_4$, while the lead free glass SG64 ranking is 4.1 (Class III begins at 8.5). The lead free glass SG64 was therefore ranked by the test to be a Class III pharmaceutical glass. The lead free glass SG64 is then highly durable. Lead glass SG10, as well as Sylvania's SG80, SG81, and SG91 lime glasses, as presently formulated could not be classified as pharmaceutical glasses due to their high alkali release when exposed to water. The obvious advantage of the lead free glass SG64 to the lighting industry is superior resistance to warehouse weathering, which then allows long-term glass storage. Reports indicate that the lead free glass SG64 after 8 months of warehouse storage appeared as good as the lead glass SG10 after 3 weeks storage. The higher glass durability translates into reduced glass seal shrinkage (failure during manufacture), since warehouse weathering products such as Na$_2$CO$_3$, NaSO$_4$, NaOH, and so on, when sealed into the product produce high surface stresses, resulting in "brittle" glass, and therefore increased manufacturing failures.

The liquidus temperature was controlled to assure at least a 50° C. spread between the liquidus temperature and the Vello forming temperature corresponding to a viscosity of 50,000 poise. The temperature spread is to ensure the glass does not devitrify during glass manufacturing. The lead free glass SG64 was found to have a spread of 57° C. Minimizing the BaO content of the glass was found to be important in controlling the liquidus temperature. In addition, too high an Al$_2$O$_3$ content also raised the liquidus temperature.

Mechanically the lead free glass SG64 has a Knoop hardness of 581 which exceeds the borosilicate glass (hard glass) value of 550. Lead glass SG10 was measured at 448. The implication of this being superior scratch resistance, and therefore glass strength. The glass density of lead free glass SG64 at 2.60 grams per cubic centimeter, is also lower than that of lead glass SG10 at 2.85 grams per cubic centimeter, meaning nine percent more glass can be manufactured per pound of glass melted.

The primary reason for developing a lead-free glass was to eliminate lead from the workplace. The lead free glass SG64 passed the toxicity characteristic leaching procedure, method 1311, established by the E.P.A., since there was no lead to leach, and the barium leached at one percent of the allowed limit. Lamp glass made from the lead free glass SG64 can therefore be safely disposed of in a landfill.

Compositions within the present invention could devitrify in a Vello process with BaO above 10.5 weight percent. For use in Vello equipment, it is suggested that BaO therefore be kept at below 10.5 weight percent. Working properties for the compositions of the present invention were, however, significantly improved by reducing the BaO content to about 8.0 weight percent.

While there have been shown and described what are at present considered to be the preferred embodiments of the invention, it will be apparent to those skilled in the art that various changes and modifications can be made herein without departing from the scope of the invention defined by the appended claims.

What is claimed is:

1. An electric lamp with a lead free glass comprising:
   a) a light source enclosed in
   b) a glass body including at least a portion formed from a sealing glass having a weight percent composition of:

| | |
|---|---|
| SiO$_2$ | 64.3 to 70.7 |
| BaO | 6.2 to 10.5 |
| CaO + MgO | 2.5 to 5.7 |
| Na$_2$O | 7.0 to 12.0 |
| K$_2$O | 5.5 to 10.2 |
| Li$_2$O | 0.0 to 2.0 |
| Al$_2$O$_3$ | 3.0 to 5.3 |
| B$_2$O$_3$ | 0.0 to 3.0 |
| a fining agent | 0.0 to 1.0 | c) electric leads having interior ends coupled to the light source, having middle sections passing from the interior of the envelope to the exterior of the glass body, and exterior ends; and
   d) contacts coupled to the exterior ends of the electric leads for receiving electric power.

2. An electric lamp with lead free glass comprising:
   a) a light source enclosed in
   b) a glass body including at least a portion formed from a sealing glass having a weight percent composition of:

| | |
|---|---|
| SiO$_2$ | 66.09 |
| BaO | 8.09 |
| CaO | 2.66 |
| Na$_2$O | 7.41 |
| K$_2$O | 7.00 |
| Li$_2$O | 1.28 |
| Al$_2$O$_3$ | 4.70 |
| B$_2$O$_3$ | 2.39 and |
| a fining agent | of 0.0 to 1.0; | c) electric leads having interior ends coupled to the light source, having middle sections passing from the interior of the envelope to the exterior of the glass body, and exterior ends; and
   d) contacts coupled to the exterior ends of the electric leads for receiving electric power.

3. The lamp in claim 1, wherein the glass body has an electrical resistivity (log$_{10}$ rho) at 350° C. of 7.0 ohm centimeters or more.

4. The lamp in claim 1, wherein the glass body has a thermal expansion of $91.5 \times 10^{-7}$ in/in/° C. ($+/-1.5 \times 10^{-7}$ in/in/° C.) from 0° C. to 300° C.

5. The lamp in claim 1, wherein the lamp is an incandescent lamp.

6. The lamp in claim 1, wherein the lamp is a fluorescent lamp.

7. The lamp in claim 1, wherein the lamp is a neon lamp.

8. A blown bulb for use in an electric lamp having a weight percent composition of:

| | |
|---|---|
| SiO$_2$ | 64.3 to 70.7 |
| BaO | 6.2 to 10.5 |
| CaO + MgO | 2.5 to 5.7 |
| Na$_2$O | 7.0 to 12.0 |
| K$_2$O | 5.5 to 10.2 |
| Li$_2$O | 0.0 to 2.0 |
| Al$_2$O$_3$ | 3.0 to 5.3 |

-continued

| | |
|---|---|
| B₂O₃ | 0.0 to 3.0 |
| a fining agent | 0.0 to 1.0. |

9. An electric lamp with lead free glass mount comprising:
a) a filament,
b) two electric leads having interior ends coupled to the filament, intermediate regions and exterior ends for electrical connection,
c) a glass mount sealed along the intermediate regions of the leads, the glass mount having a weight percent composition of:

| | |
|---|---|
| SiO₂ | 64.3 to 70.7 |
| BaO | 6.2 to 10.5 |
| CaO + MgO | 2.5 to 5.7 |
| Na₂O | 7.0 to 12.0 |
| K₂O | 5.5 to 10.2 |
| Li₂O | 0.0 to 2.0 |
| Al₂O₃ | 3.0 to 5.3 |
| B₂O₃ | 0.0 to 3.0 |
| a fining agent | 0.0 to 1.0 and | d) a glass envelope sealed to the mount to enclose the filament.

10. The lamp in claim 9, wherein the mount glass composition comprises:

| | |
|---|---|
| SiO₂ | 66.09 |
| BaO | 8.09 |
| CaO | 2.66 |
| Na₂O | 7.41 |
| K₂O | 7.00 |
| Li₂O | 1.28 |
| Al₂O3 | 4.70 |
| B₂O3 | 2.39 and |
| a fining agent | 0.0 to 1.0. |

11. The lamp in claim 9, wherein the lamp is an incandescent lamp.

12. The lamp in claim 9, wherein the lamp is a fluorescent lamp.

13. An electric lamp with lead free glass comprising:
a) a light source enclosed in
b) a glass body including at least a portion formed from a sealing glass having no lead and having:
a softening point of 667° C. (+/−5° C.),
a working point of 978° C. (+/−5° C.),
a viscosity of 50,000 poise or less, at 887° C. (+/−5° C.),
a log₁₀ volume electrical resistivity of 6.0 ohm centimeters or more at 350° C.,
a thermal expansion of $91.5 \times 10^{-7}$ in/in/° C. ($+/-1.5 \times 10^{-7}$ in/in/° C.) from 0° C. to 300° C., and a weight percent composition comprising:

| | |
|---|---|
| SiO₂ | 64.3 to 70.7 |
| BaO | 6.2 to 10.5 |
| CaO + MgO | 2.5 to 5.7 |
| Na₂O | 7.0 to 12.0 |
| K₂O | 5.5 to 10.2 |
| Li₂O | 0.0 to 2.0 |
| Al₂O₃ | 3.0 to 5.3 |
| B₂O₃ | 0.0 to 3.0 |
| a fining agent | 0.0 to 1.0; | c) electric leads having interior ends coupled to the light source, having middle sections passing from the interior of the envelope to the exterior of the envelope, and exterior ends; and
d) contacts coupled to the exterior ends of the electric leads for receiving electric power.

14. The lamp in claim 13, wherein the lead free glass composition comprises:

| | |
|---|---|
| SiO₂ | 66.09 |
| BaO | 8.09 |
| CaO | 2.66 |
| Na₂O | 7.41 |
| K₂O | 7.00 |
| Li₂O | 1.28 |
| Al₂O₃ | 4.70 |
| B₂O₃ | 2.39 and |
| a fining agent | 0.0 to 1.0. |

15. An electric neon lamp with a lead free glass comprising:
a) a light source including a gas fill including at least five molar percent neon and enclosed in
b) a glass body including at least a portion formed from a sealing glass having a weight percent composition of:

| | |
|---|---|
| SiO₂ | 64.3 to 70.7 |
| BaO | 6.2 to 10.5 |
| CaO + MgO | 2.5 to 5.7 |
| Na₂O | 7.0 to 12.0 |
| K₂O | 5.5 to 10.2 |
| Li₂O | 0.0 to 2.0 |
| Al₂O₃ | 3.0 to 5.3 |
| B₂O₃ | 0.0 to 3.0 and |
| a fining agent | 0.0 to 1.0 | c) electric leads having interior ends coupled to the light source, having middle sections passing from the interior of the envelope to the exterior of the envelope, and exterior ends; and
d) contacts coupled to the exterior ends of the electric leads for receiving electric power.

* * * * *